United States Patent [19]

Ogino

[11] Patent Number: 5,633,976
[45] Date of Patent: May 27, 1997

[54] IMAGE RECORDING APPARATUS AND ELECTRONIC STILL CAMERA

[75] Inventor: Hiroyuki Ogino, Yokohama, Japan

[73] Assignee: Canon Kabushiki Kaisha, Tokyo, Japan

[21] Appl. No.: 380,435

[22] Filed: Jan. 30, 1995

Related U.S. Application Data

[63] Continuation of Ser. No. 984,504, Dec. 2, 1992, abandoned.

[30] Foreign Application Priority Data

Dec. 6, 1991 [JP] Japan .................................. 3-323097

[51] Int. Cl.$^6$ ........................................................ H04N 5/225
[52] U.S. Cl. ................................................ 386/120; 348/231
[58] Field of Search ............................. 360/35.1, 7, 33.1, 360/13; 348/231; 358/335; 386/1, 46, 120

[56] References Cited

U.S. PATENT DOCUMENTS

| | | | |
|---|---|---|---|
| 4,420,773 | 12/1983 | Toyoda et al. | 360/33.1 X |
| 5,003,506 | 3/1991 | Itiya | 364/900 |
| 5,027,214 | 6/1991 | Fujimori | 348/231 |
| 5,068,805 | 11/1991 | Tsuzuki | 395/164 |
| 5,130,812 | 7/1992 | Yamaoka | 360/35.1 X |
| 5,138,503 | 8/1992 | Nishida | 360/35.1 |
| 5,155,584 | 10/1992 | Taguchi et al. | 358/41 |
| 5,218,452 | 6/1993 | Kondo et al. | 360/35.1 X |
| 5,249,053 | 9/1993 | Jain | 348/231 |

FOREIGN PATENT DOCUMENTS 01288491  11/1989  Japan .

*Primary Examiner*—Andrew L. Sniezek
*Attorney, Agent, or Firm*—Fitzpatrick, Cella, Harper & Scinto

[57] ABSTRACT

The present invention is to enable phototaking operation even during the signal transfer from the buffer to the final recording medium. Image pickup device 14 converts the optical image into an electrical signal. A recording process circuit 20 applies a process, such as compression, to the taken image. The image information processed by the circuit 20 is recorded in a rigid disk device 26, through a buffer memory 22 and an interface 28, under the control of a memory control circuit 24. A system control circuit 30 enables the continuous recording operation or the single recording operation, respectively when the remaining capacity of the memory 22 is at least equal to V1, or less than V1. Also the circuit 30 interrupts the continuous recording operation or reduces the rate of the continuous recording, if the remaining capacity of the memory 22 reaches V2 (<V1) in the course of a continuous recording operation. V2 corresponds to a memory capacity of image information of at least an image frame.

24 Claims, 15 Drawing Sheets

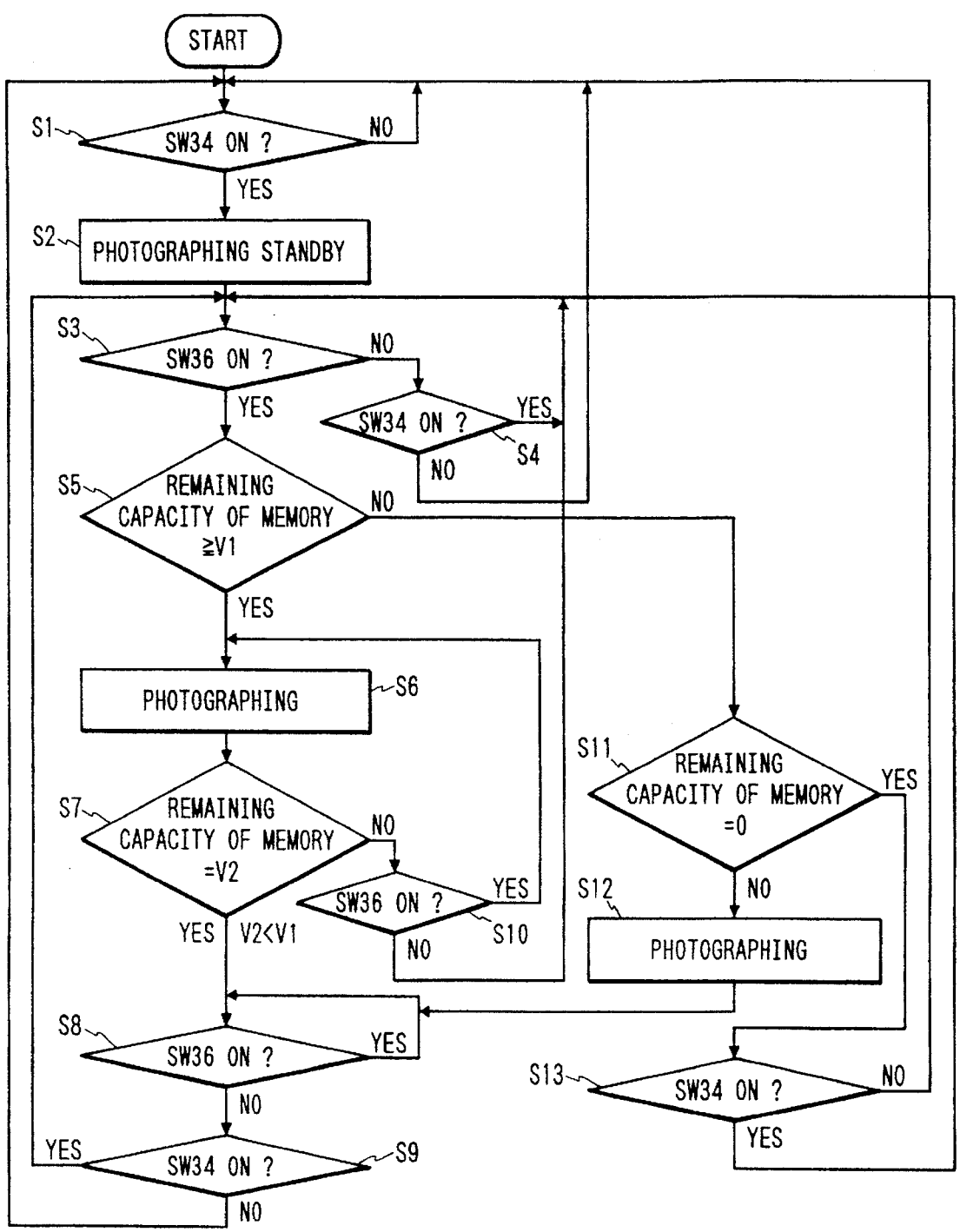

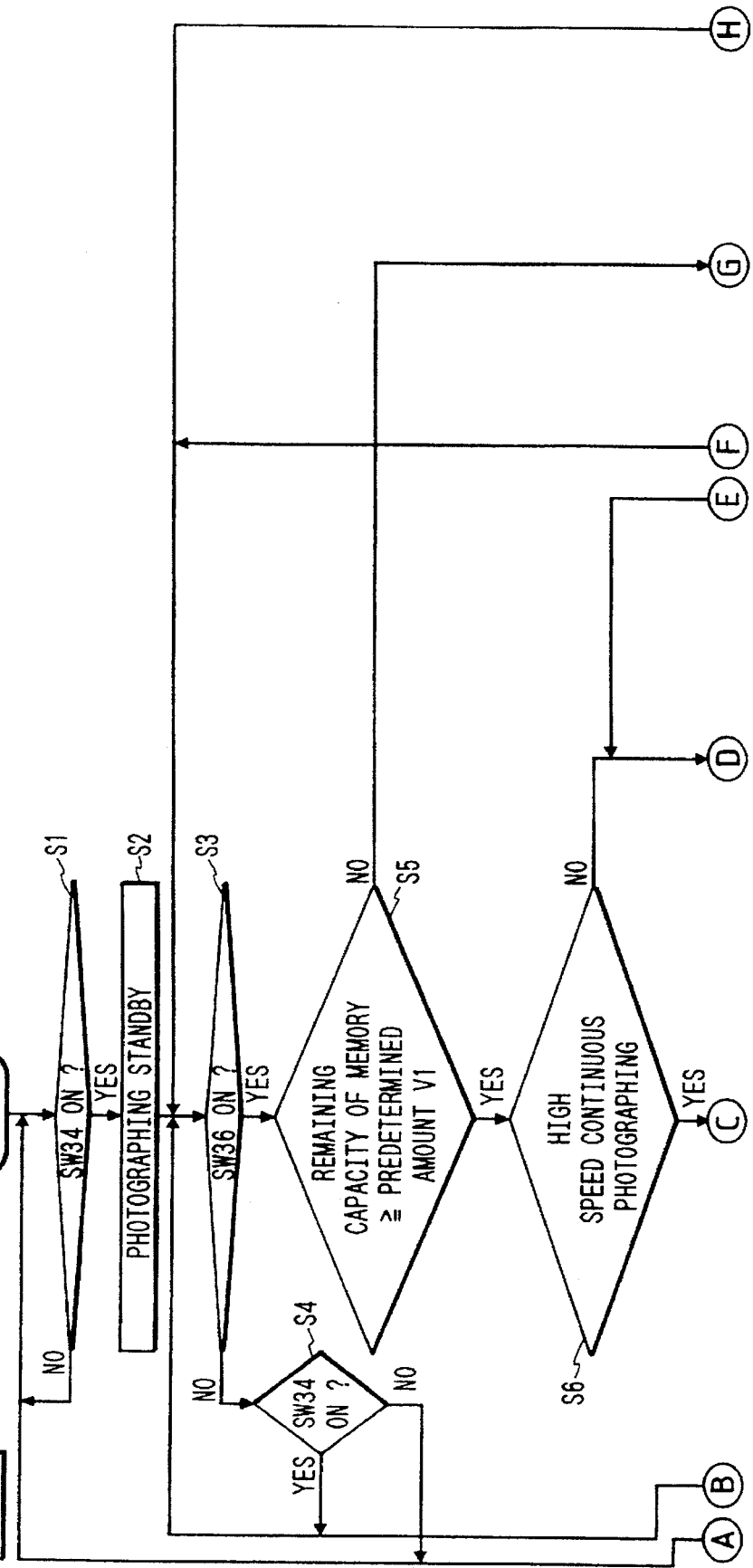

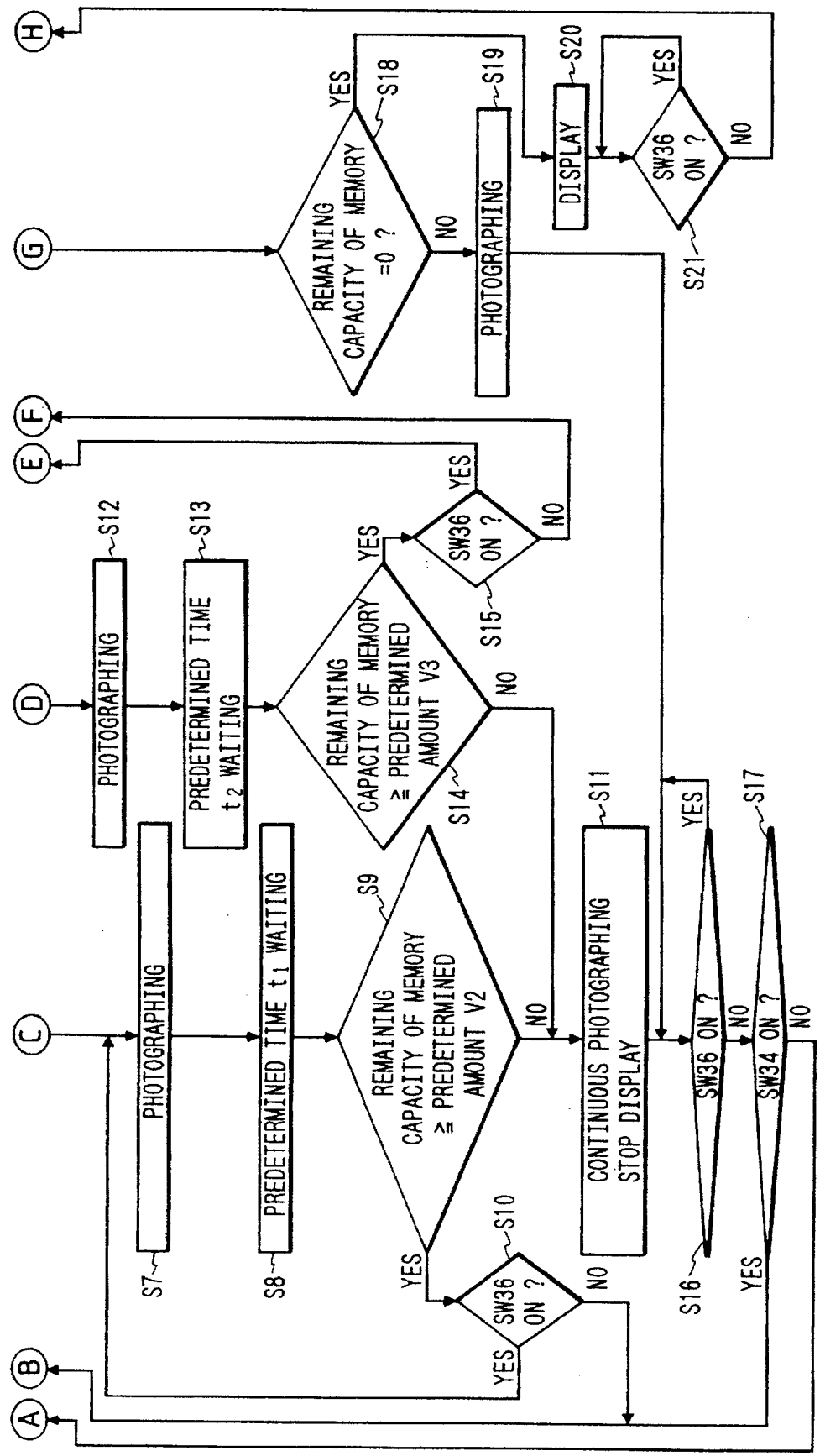

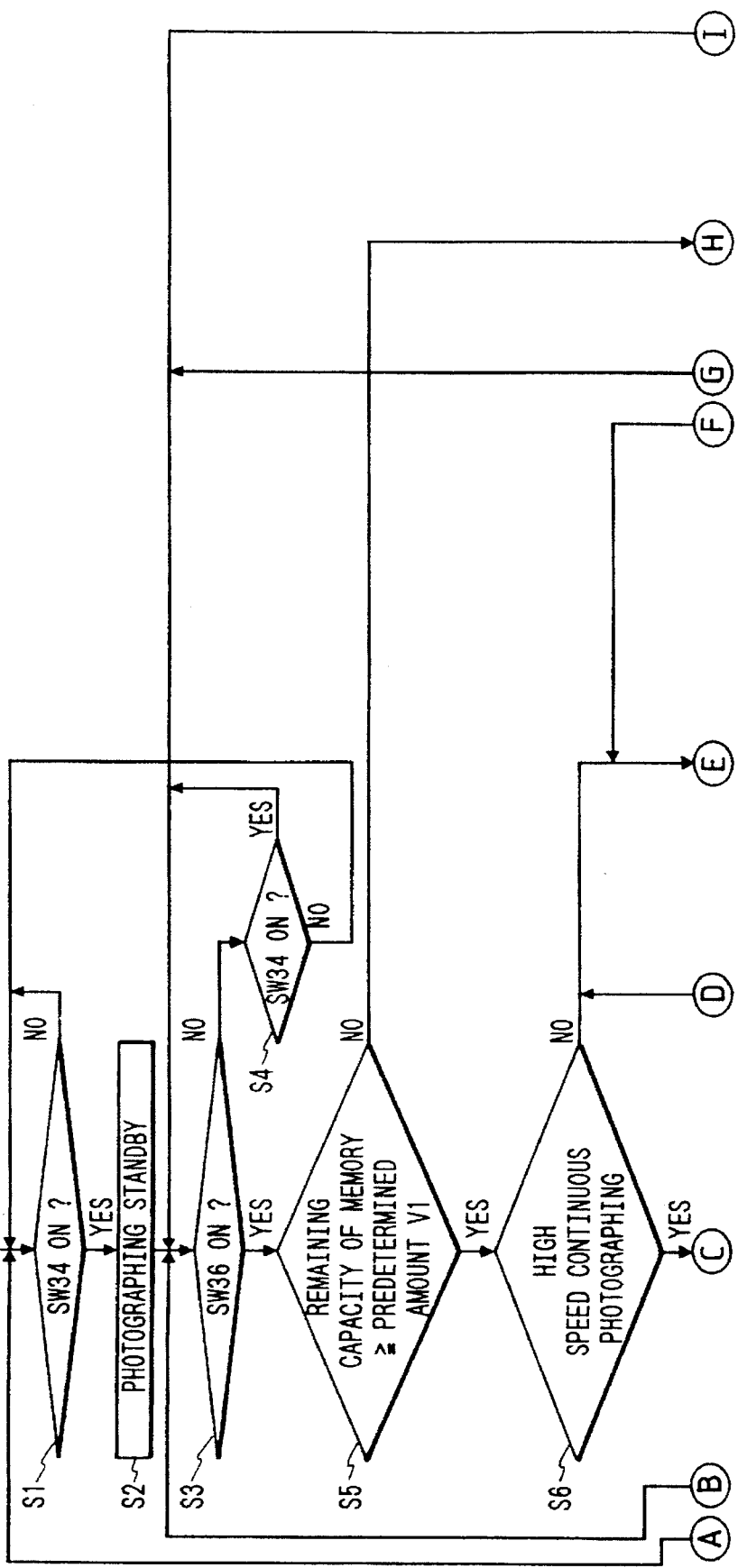

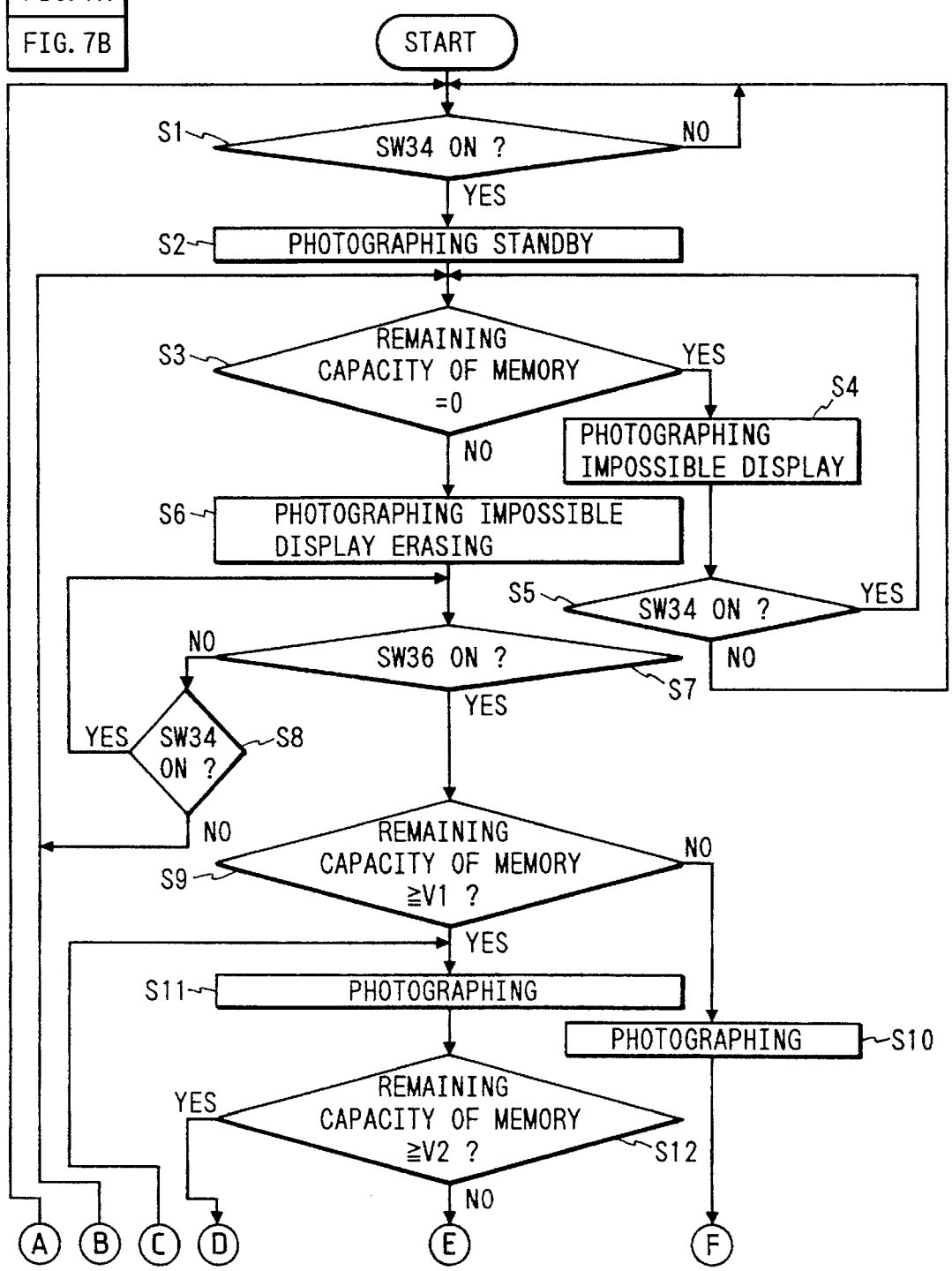

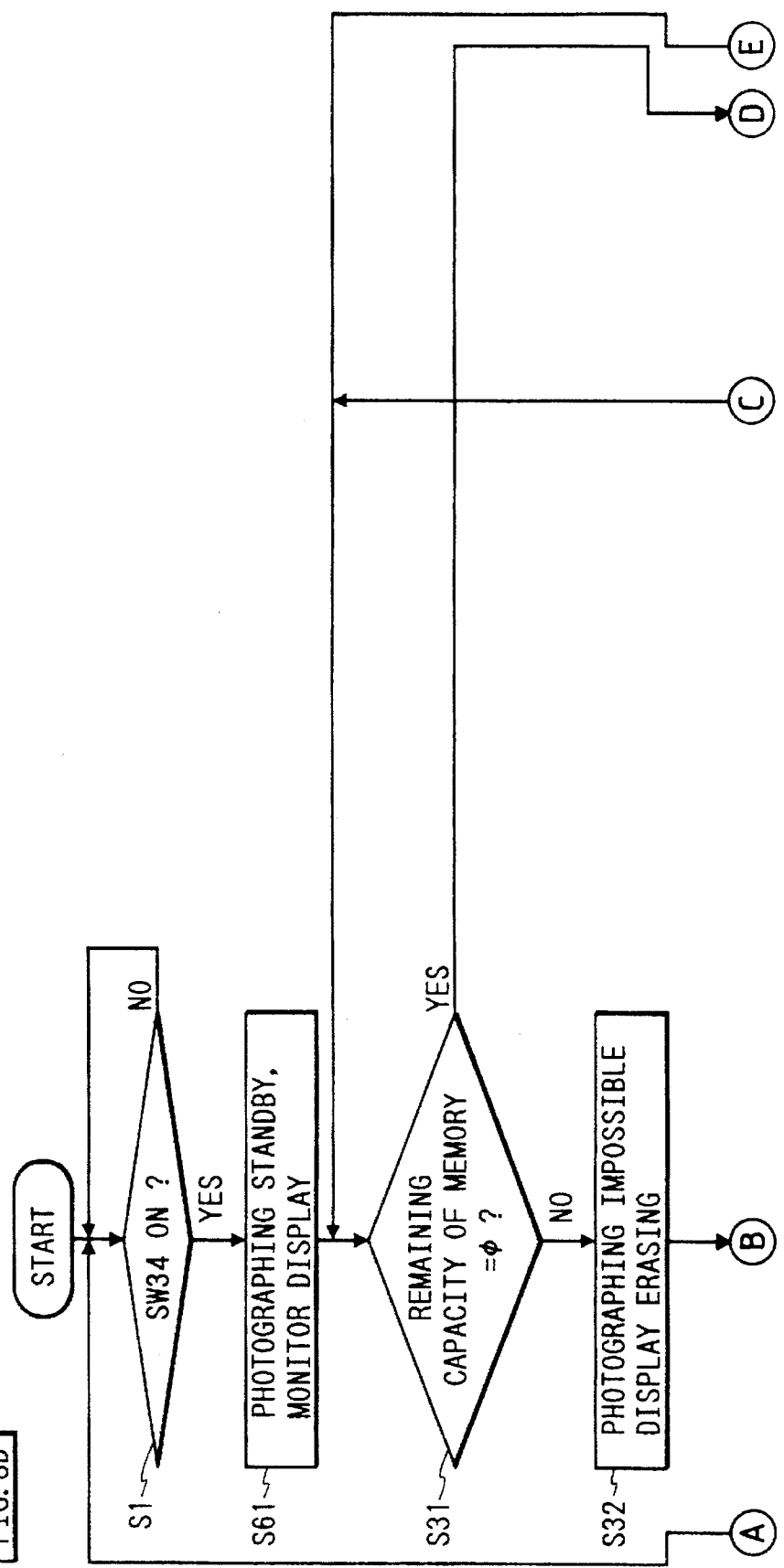

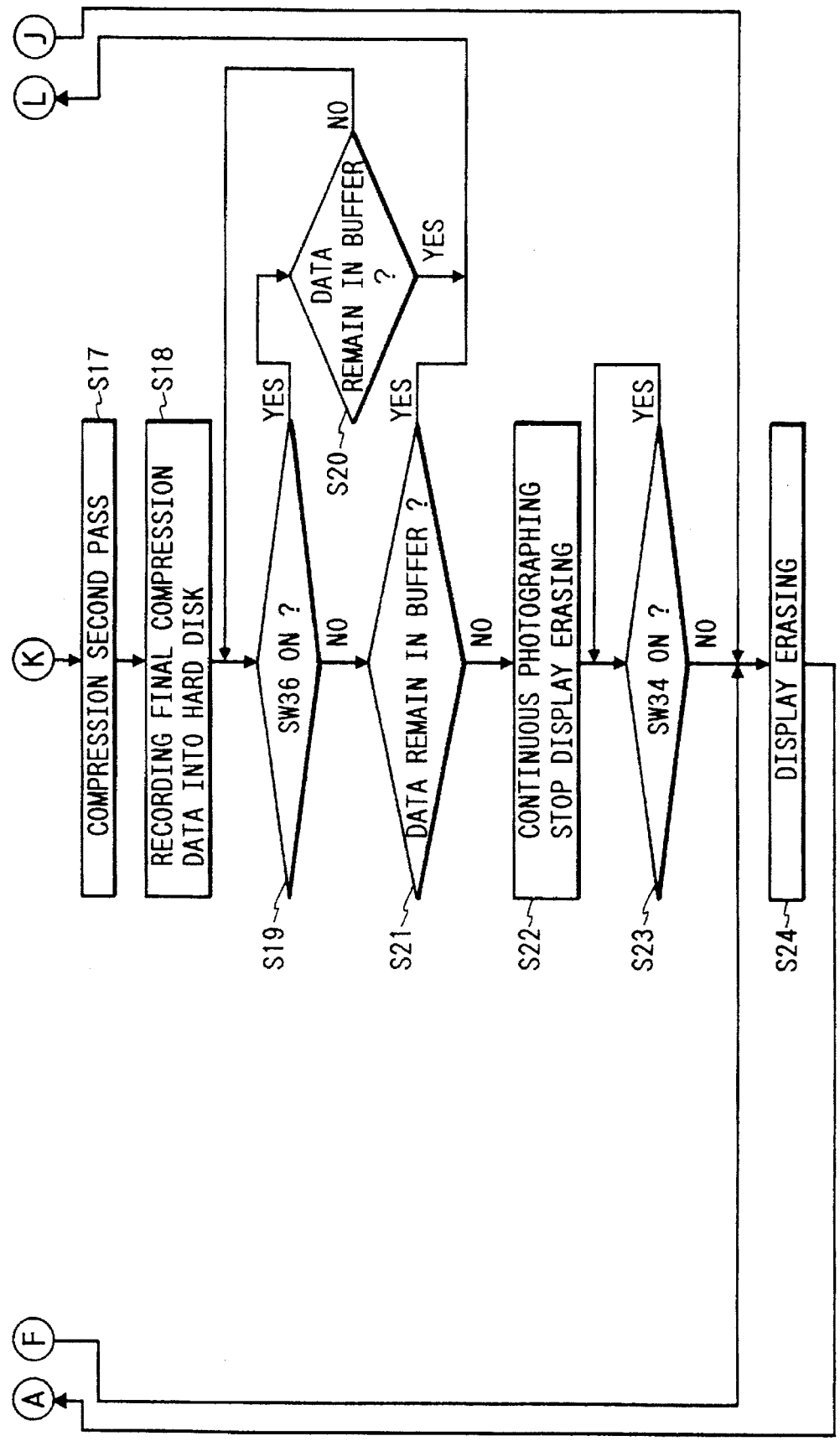

IMAGE RECORDING APPARATUS AND ELECTRONIC STILL CAMERA

This application is a continuation application of Ser. No. 07/984,504 filed Dec. 2, 1992, now abandoned.

BACKGROUND OF THE INVENTION

1. Field of the Invention

The present invention relates to an image recording apparatus and an electronic still camera.

2. Related Background Art

There is already known an electronic still camera, in which the image of an object is converted by a solid-state image pickup device into an electric signal and recorded on a recording medium. As the recording medium for the obtained image information, there was initially proposed a small flexible magnetic disk, but an apparatus utilizing a semiconductor memory was also proposed later, due to the increase in the capacity thereof. Also compact rigid disk devices (2 inches or smaller) which have been commercialized recently are attracting attention as the recording medium for the electronic still camera because of their compactness.

In general, the electronic still camera is provided with a single shot mode in which a single object image is taken by a single shutter releasing operation, as in the conventional still camera employing the silver halide film as the recording medium, and a continuous shot mode in which the object image is taken in succession at a predetermined interval while the shutter release button is kept depressed.

As the amount of information to be recorded per image phane is relatively large, the transmission or writing speed to the flexible magnetic disk, solid-state memory or rigid disk constituting the final recording medium is slower than the processing speed in the image pickup device or in the circuit for processing the output signals thereof. For practically increasing the transmission speed, there has been proposed a configuration in which a buffer memory capable of temporarily storing the image information of plural frames is provided for buffering the image information obtained in the continuous shot mode.

In such electronic still camera, however, it is not acceptable to increase the volume of the camera by assigning a large space to such buffer memory, since such electronic still camera has to be handily portable as a replacement for the conventional camera utilizing the silver halide film. Also the semiconductor memories are costly if it is used in a large quantity, even though memory devices of a large memory capacity have become available by the advancement in the level of integration.

For these reasons, the capacity of the buffer memory has to be limited at a certain level, but, if the capacity is not enough, the remaining capacity of the buffer memory may become deficient in the course of a continuous phototaking operation so that the image recording may become impossible.

SUMMARY OF THE INVENTION

In consideration of the foregoing, an object of the present invention is to provide an image recording apparatus and an electronic still camera, capable of effectively utilizing the buffer memory mentioned above.

Another object of the present invention is to provide an image recording apparatus and an electronic still camera, with various functions.

Still another object of the present invention is to provide an image recording apparatus and an electronic still camera by which the photographer does not lose the opportunity of phototaking.

The above-mentioned objects can be attained, according to the present invention, by an image recording apparatus for recording input image information in a final recording medium through a temporary memory means capable of storing image information of plural image planes, comprising continuous recording stop means for stopping the continuous recording of the input image information when the remaining capacity of the temporary memory means is equal to or less than a first threshold value; first continuous recording stop means for stopping the continuous recording operation when the remaining capacity of said temporary memory means becomes equal to or less than a second threshold value smaller than said first threshold value in the course of a continuous recording operation; and second continuous recording stop means for stopping the continuous recording when a predetermined number of continuously recorded image planes is reached, whereby the continuous shots or continuous recording is stopped with a certain margin in said temporary memory means. Consequently, the photographer can effect phototaking (recording) by the single shot mode, without losing the opportunity of phototaking. Also since the image information is transmitted from the temporary memory means to the final recording medium even during the inhibition of the continuous recording, the remaining capacity of said temporary memory means continuously increases, so that the continuous recording is enabled soon.

Still another object of the present invention is to provide an image recording apparatus capable of achieving special effects utilizing the memory, with a simple configuration.

Still other objects of the present invention, and the advantages thereof, will become fully apparent from the following description.

BRIEF DESCRIPTION OF THE DRAWINGS

FIG. 2 is a flow chart showing a first function sequence of the embodiment shown in FIG. 1;

FIGS. 3, 3A and 3B show a second function sequence of the embodiment shown in FIG. 1;

FIGS. 4, 4A and 4B show a third function sequence of the embodiment shown in FIG. 1;

FIGS. 5, 5A and 5B show a fourth function sequence of the embodiment shown in FIG. 1;

FIGS. 7, 7A and 7B show a first function sequence of the embodiment shown in FIG. 6; and FIGS. 8, 8A, 8B, 8C and 8D show a second function sequence of the embodiment shown in FIG. 6.

DESCRIPTION OF THE PREFERRED EMBODIMENTS

Now the present invention will be clarified in detail by preferred embodiments thereof shown in the attached drawings.

Figure 1:
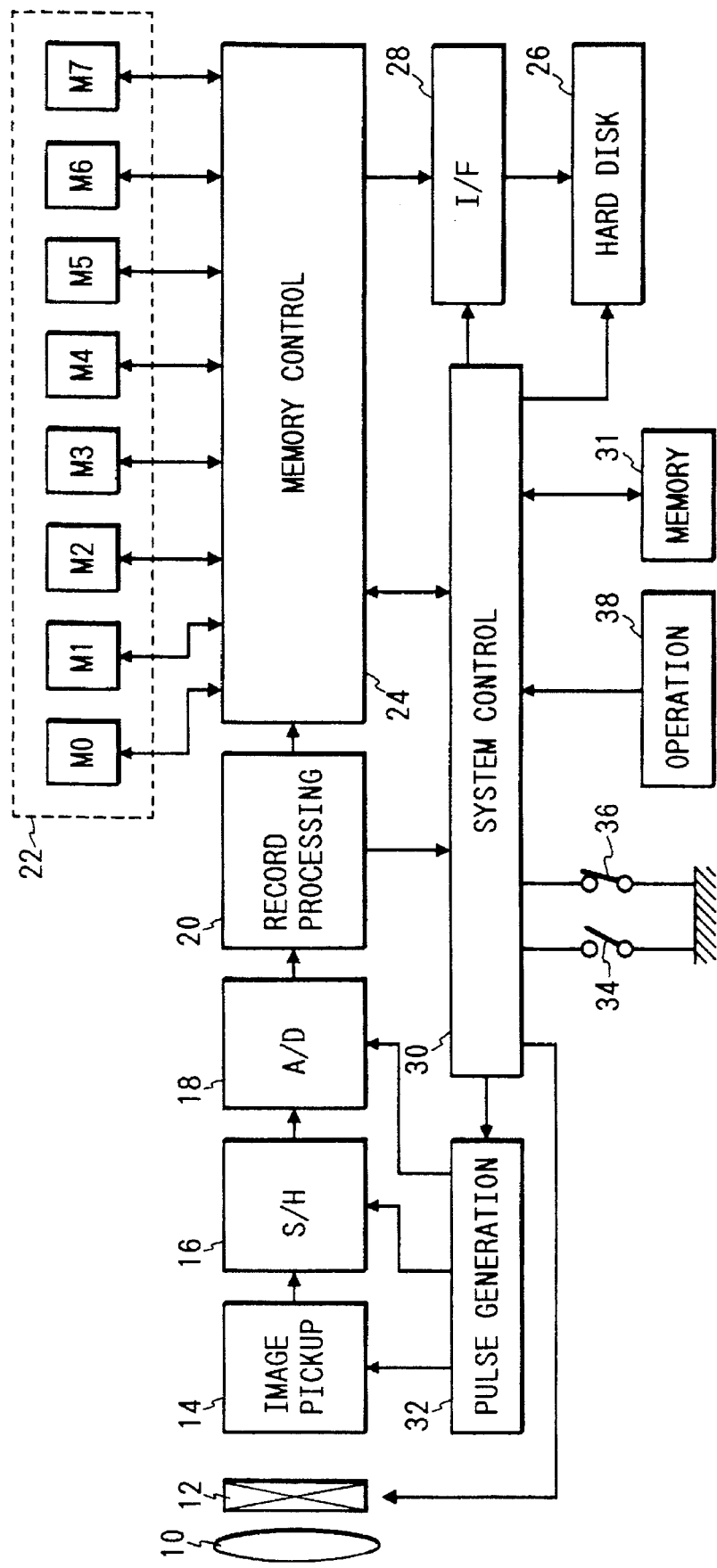
FIG. 1 is a block diagram of a first embodiment of the present invention.

FIG. 1 is a schematic block diagram of an embodiment of the present invention, wherein shown are a photographing lens 10; a light amount control member 12 such as a diaphragm and a shutter; an image pickup device 14 for converting an optical image into an electrical signal; a sample hold (S/H) circuit 16 for holding the sample of the output of the image pickup device 14; an A/D converter 18 for converting the output of the S/H circuit 16 into a digital signal; and a recording process circuit 20 for applying the recording process such as compression and modulation to the output of the A/D converter 18.

There are also provided a buffer memory 22, consisting for example of a semiconductor memory, for storing the output of the recording process circuit 20 in the unit of an image plane; and a memory control circuit 24 for controlling the write-in and the read-out of said buffer memory 22. In the present embodiment, for facilitating the understanding, it is assumed that the taken image is compressed by fixed length encoding which provides a fixed data amount per image plane after compression, and that the buffer memory 22 consists of 8 banks for storing the compressed image information of 8 image planes at maximum.

There are further provided a final recording medium 26 consisting for example of a rigid disk device; and an interface circuit 28 for writing the image information, read by the memory control circuit 24 from the buffer memory 22, into the rigid disk device 26. Said rigid disk device may be replaced by a flexible magnetic disk drive, an optical disk drive, a magnetooptical disk drive, or a solid-state memory device such as an EEPROM or a DRAM with a back-up battery. An example of said solid-state memory device is a memory card, available in the form of a card. In the present embodiment, the writing speed into the buffer memory 22 is faster than that into the rigid disk device 26. For this reason, the buffer memory 22 has a capacity of 8 image planes. In general, the present invention is effective if the writing speed into the final recording medium is slower than that into the temporary memory means. Even when the writing speed into the final recording medium is not slower than that into the temporary memory means, the present invention is still effective if the processing speed of an intermediate processing circuit, for example the information compressing circuit is slower than the writing speed into the temporary memory means.

A system control circuit 30, for controlling the entire system, is composed of a microcomputer, and allows to expand or vary the functions by a modification in the function program thereof. A memory 31 is provided for storing various constants (such as threshold values V1, V2 and V3 to be explained later) required for the operation of the system control circuit 30.

A pulse generation circuit 32 supplies the image pickup device 14, the S/H circuit 16 and the A/D converter 18 with clock pulses required for the driving thereof, under the control of the system control circuit 30.

There are also provided a photographing stand-by switch 34 for instructing a photographing stand-by operation (light metering, color measurement, focusing control etc.) to the system control circuit 30, and a photographing switch 36 for instructing a photographing operation (exposing the image pickup device 14 and storing the signals thereof in the rigid disk device) to the system control circuit 30. The photographing stand-by switch 34 and photographing switch 36 are incorporated in so-called shutter release button, and are respectively closed when the shutter release button is depressed by a half stroke and by a full stroke.

An operation unit 38, provided with certain operation buttons or switches, serves to set various function modes such as the single shot mode or continuous shot mode and to enter various instructions to the system control circuit 30.

The image information in FIG. 1 flows in the following manner. An optical image, formed by the photographing lens 10 enters, through the light amount control member 12, the image pickup face (photoelectric converting face) of the image pickup device 14, which converts the optical image into an electrical signal. The output signal of the image pickup device 14 is subjected to sample holding by the S/H circuit 16, and is converted into a digital signal by the A/D converter 18. The recording process circuit 20 applies, to the digital image signal released from the A/D converter 18, the recording process such as white balance control, compression and modulation, and the output signal from the recording process circuit 20 is stored, under the control of the memory control circuit 22, in succession in empty ones of the eight banks M0–M7 of the buffer memory 22.

The memory control circuit 24 reads out the data, stored in the buffer memory 22, in succession according to the writing speed of the rigid disk device 26, and sends thus read out data to the rigid disk device 26 through the interface circuit 28. The rigid disk device 26 in succession stores the data from the interface circuit 28. In this manner the compressed data of the photographed images are stored in the rigid disk device 26.

In the following there will be explained the function of the present embodiment, with reference to a flow chart in FIG. 2, showing the function sequence of the system shown in FIG. 1. At first there will be explained the function in case the continuous shot mode is selected by the operation unit 38, wherein the object is phototaken and recorded continuously, namely at a predetermined interval while the photographing switch 36 is maintained closed.

At first, when the photographing stand-by switch 34 is closed (S1), there is executed the photographing stand-by operation, such as the exposure control, white balance adjustment and focusing (S2). Thereafter, if the photographing switch 36 is not closed (S3) and if the photographing stand-by switch 34 is turned off (S4), the sequence awaits that the photographing stand-by switch 34 is turned on again (S1). Also if the photographing switch 36 is not closed (S3) and if the photographing stand-by switch 34 is not turned off, the sequence awaits that the photographing switch 36 is turned on (S4).

When the photographing switch 36 is turned on (S4), and if the continuous recording mode is set by the operation unit 38, the system control circuit 30 checks, through the memory control circuit 24, whether the remaining capacity of the buffer memory 22 is at least equal to a predetermined threshold value V1 (S5), which is stored in the memory 31 in advance. If the remaining capacity is at least equal to V1 (S5), there is executed the photographing operation (S6), by exposing the image pickup device 14, reading out and recording the charge signal thereof in the buffer memory 22 through the circuits 16, 18, 20 and 24. The data stored in the buffer memory 22 are read in synchronization with the rigid disk device 26 as explained above and stored therein through the interface circuit 28.

In case the continuous recording mode is not selected by the operation unit 38, the photographing operation is enabled if the buffer memory 22 has the empty capacity of a image plane.

After the photographing operation (S5), there is discriminated whether the remaining capacity of the buffer memory 22 is equal to a second threshold value V2 (S7), which is smaller than the first threshold value V1 and corresponds to a image plane or several image planes.

If the remaining capacity of the buffer memory 22 is not equal to the second threshold value V2 (S7), the continuous photographing is executed by repeating the photographing operation (S6) and the checking of the remaining capacity of the memory 22 (S7) without execution of the step S5 while the photographing switch 36 is turned on (S10). If the photographing switch 36 is turned off in the course of this operation (S10), the states of the photographing switch 36 and the photographing stand-by switch 34 are checked (S3, S4), and, the sequence returns to the step S1 if the photographing stand-by switch 34 is turned off (S4).

If the remaining capacity of the memory 22 becomes equal to the threshold value V2 (S7), the continuous recording mode is interrupted and the sequence functions in the same manner as in the single shot mode. More specifically, the sequence awaits that the photographing switch 36 is turned off (S8), and, if the photographing stand-by switch 34 remains turned on after the photographing switch 36 is turned off (S9), the sequence awaits that the photographing switch 36 is turned on again (S3). If the photographing stand-by switch 34 is turned off (S9), the sequence awaits that the photographing stand-by switch 34 is turned on again (S1).

In case the remaining capacity of the memory 22 is less than the threshold value V1 (S5), there is checked whether the remaining capacity is zero (S11). When the remaining capacity is zero, and, if the photographing stand-by switch 34 is turned on (S13), the sequence awaits that the photographing switch 36 is turned on (S3). If the photographing stand-by switch 34 is turned off (S13), the sequence awaits that the photographing stand-by switch 34 is turned on (S1). When the remaining capacity is not zero (S11), there is executed a photographing operation (S12), and then the sequence awaits that the photographing switch 36 is turned off (S8).

As will be understood from the foregoing explanation, the threshold value V1 corresponds to a remaining memory capacity enabling the continuous recording operation at the start thereof, while the threshold value V2 corresponds to a remaining memory capacity disabling the continuous recording operation. The threshold values V1, V2 are stored in the memory 31 either in fixed manner or variably through the function of the operation unit 38. The latter is more convenient for use.

The continuous recording operation is enabled if the remaining capacity of the memory 22 is equal to or larger than V1, and the operation is interrupted when the remaining capacity of the memory 22 becomes equal to the threshold value V2 in the course of the continuous recording operation. The single recording operation is still enabled even when the remaining capacity of the buffer memory 22 is equal to or less than V2, and in such state, the continuous recording operation is enabled again when the remaining capacity of the buffer memory 22 becomes equal to or larger than the threshold value V1 by the progress of signal transmission from the buffer memory 22 to the rigid disk device 26. The single recording operation is still enabled even if the remaining capacity of the buffer memory 22 is less than V1 at the start of the continuous recording operation, as long as said capacity is not zero.

Consequently, the number of frames recordable in the continuous recording operation is determined by the difference between the recording speed of the buffer memory 22 and that of the rigid disk device 26, and by the threshold value V1. The photographer does not lose the opportunity of photographing, since the single recording operation is still possible even when the continuous recording operation is disabled.

Figure 3A:
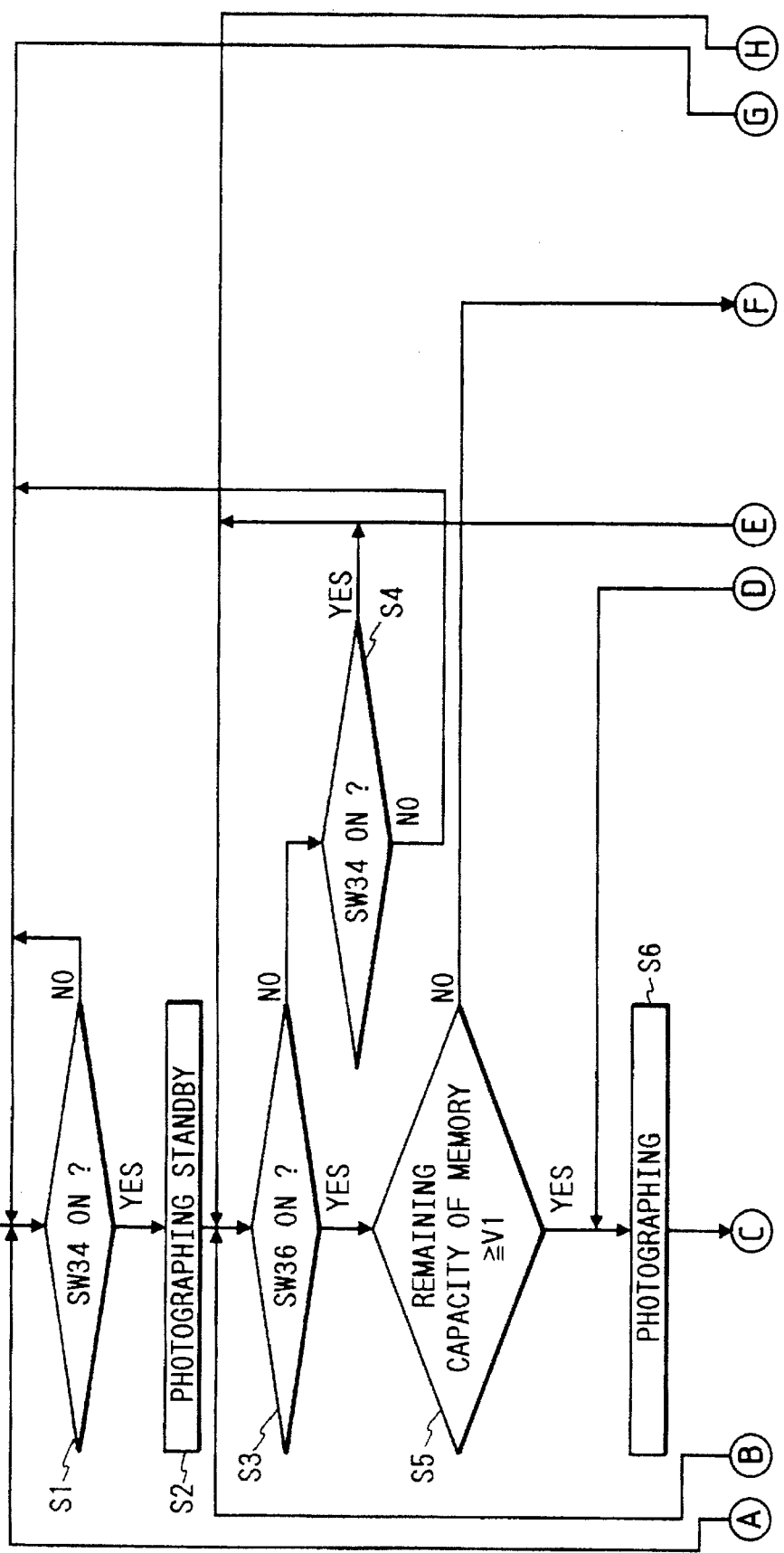
Figure 3B:
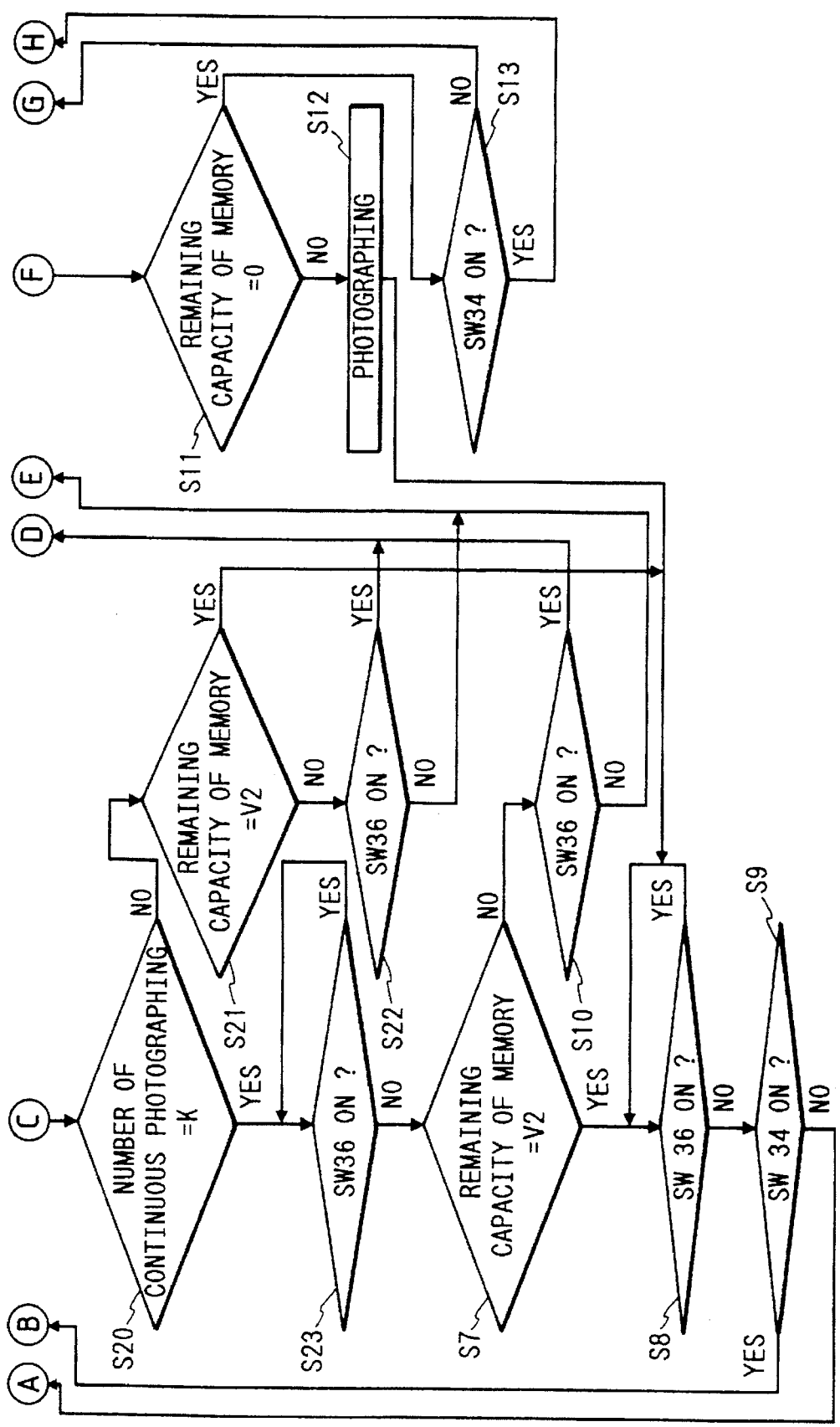

A modified function sequence of the embodiment shown in FIG. 1 is shown in a flow chart in FIGS. 3A and 3B, wherein steps same as those in FIG. 2 are represented by same numbers. More specifically, the flow chart shown in FIG. 3B has additional steps S20–S23 between the steps S6 and S7 in FIG. 2. In this modification, a maximum number K of image planes in the continuous recording operation is determined in advance. The number K is rendered variable by the operation unit 38 and is stored in the memory 31. The continuous recording operation is interrupted if the remaining capacity of the memory 22 becomes equal to V2 before the continuous recording of K image planes. After continuous recording of K image planes, the sequence awaits that the photographing switch 36 is once turned off, thereby forcing the photographer to interrupt the continuous recording.

The function sequence in FIGS. 3A and 3B will be explained in the following. The sequence is identical with that shown in FIG. 2, until the first photographing operation (S6). After the first photographing operation, there is discriminated whether the number of continuously recorded frames has reached the preset value K (S20), and, if not, there is discriminated whether the remaining capacity of the buffer memory 22 is equal to the threshold value V2 (S21). If equal to V2, the continuous recording operation is interrupted and the sequence awaits that the photographing switch 36 is turned off (S8). If not equal to V2 (S21), the photographing operation is repeated (S22, S6, S20, S21) while the photographing switch 36 remains on, and, when the photographing switch 36 is turned off (S22), the sequence awaits that the photographing switch 36 is turned on again (S3).

When the number of continuously recorded image planes becomes equal to the preset value K (S20), the sequence awaits that the photographing switch 36 is turned off and there is then discriminated whether the remaining capacity of the memory 22 is equal to the threshold value V2 (S7). The sequence after said step S7 is identical with that shown in FIG. 2.

An unnecessarily long continuous recording operation can be avoided by selecting the upper limit K of the continuously recorded image planes at a level enough for covering the number of frames in the ordinary continuous recording operation. Also, even when the continuous recording operation is interrupted, the data in the memory 22 are continuously transmitted to the rigid disk device 26, so that the remaining capacity of the memory 22 increases by the time of start of the continuous recording operation again. The continuous recording operation is enabled if the remaining capacity of the memory 22 becomes equal to or larger than V1.

As will be easily understood from the foregoing, in the present embodiment, since the continuous recording operation is interrupted with a certain remaining capacity in the temporary memory means, additional image information may be fetched in the temporary memory means even during the transmission of the image information from the temporary memory means into the final recording medium. Stated differently, in case of a still camera, the photographer can still effect a single shot operation and need not lose the opportunity of phographing.

FIGS. 4A and 4B and 5A and 5B are flow charts showing other modified function sequences of the embodiment shown in FIG. 1.

In these sequences, plural continuous recording speeds are selectable, and the operation unit 38 is provided with means for switching the continuous recording speeds.

In the following there will be explained the function sequence shown in FIGS. 4A and 4B.

When the photographing switch 36 is turned on (S3), and if the continuous recording mode is set in advance by the operation unit 38, the system control circuit 30 checks, through the memory control circuit 24, whether the remaining capacity of the buffer memory 22 is equal to or larger than a predetermined amount V1 (S5), which is stored in the memory 31 in advance. If the remaining capacity is equal to or larger than the predetermined amount V1, there is checked whether the continuous recording mode is in a high-speed continuous recording mode (S6). If the high-speed continuous recording mode is selected, there is executed the photographing operation (S7). After waiting for a predetermined time t1 (S8), there is checked whether the remaining capacity of the memory is equal to or larger than a predetermined amount V2 (S9). If the remaining capacity is equal to or larger than V2 and the photographing switch 36 is on (S10), the photographing operation is continued to effect the continuous recording. On the other hand, if the continuous recording mode is in a low-speed continuous recording mode, there is executed a photographing operation (S12), and, after waiting for a predetermined time t2 (S13), there is checked whether the remaining capacity of the memory is equal to or larger than a predetermined amount V3 (S14). If the remaining capacity is equal to or larger than V3 and the photographing switch 36 is on (S15), the photographing operation is continued to effect the continuous recording. The above-mentioned waiting times satisfy a relation t1<t2. Stated differently, faster continuous shots can be made by waiting for t1 than waiting for t2.

If the remaining capacity of the memory becomes smaller than the predetermined amount V2 or V3 respectively in the step S9 or S14, there is given a display for interrupting the continuous recording (S11), when the photographing switch 36 is turned off (S16), the sequence proceeds to the step S3 or S1 respectively if the photographing stand-by switch 34 is on or off (S17).

Also if the remaining capacity of the memory is smaller than the predetermined amount V1 in the step S5, there is checked whether the remaining capaicty of the memory is zero (S18), and, if not zero, a photographing operation is executed and the sequence proceeds to the step S16. If zero, there is given a display indicating that the photographing operation is disabled (S20), and, when the photographing switch 36 is turned off (S20), the sequence proceeds to the step S3.

As will be apparent from the foregoing, the predetermined amount V1 corresponds to a remaining capacity of the memory enabling the continuous recording, while V2 corresponds to a remaining capacity at which the high-speed continuous recording is disabled, and V3 corresponds to a remaining capacity at which the low-speed continuous recording is disabled. In the present embodiment, there is given a condition V2>V3. These predetermined amounts may be stored in the memory in fixed manner or variably by the operation unit 38.

Figure 5B:
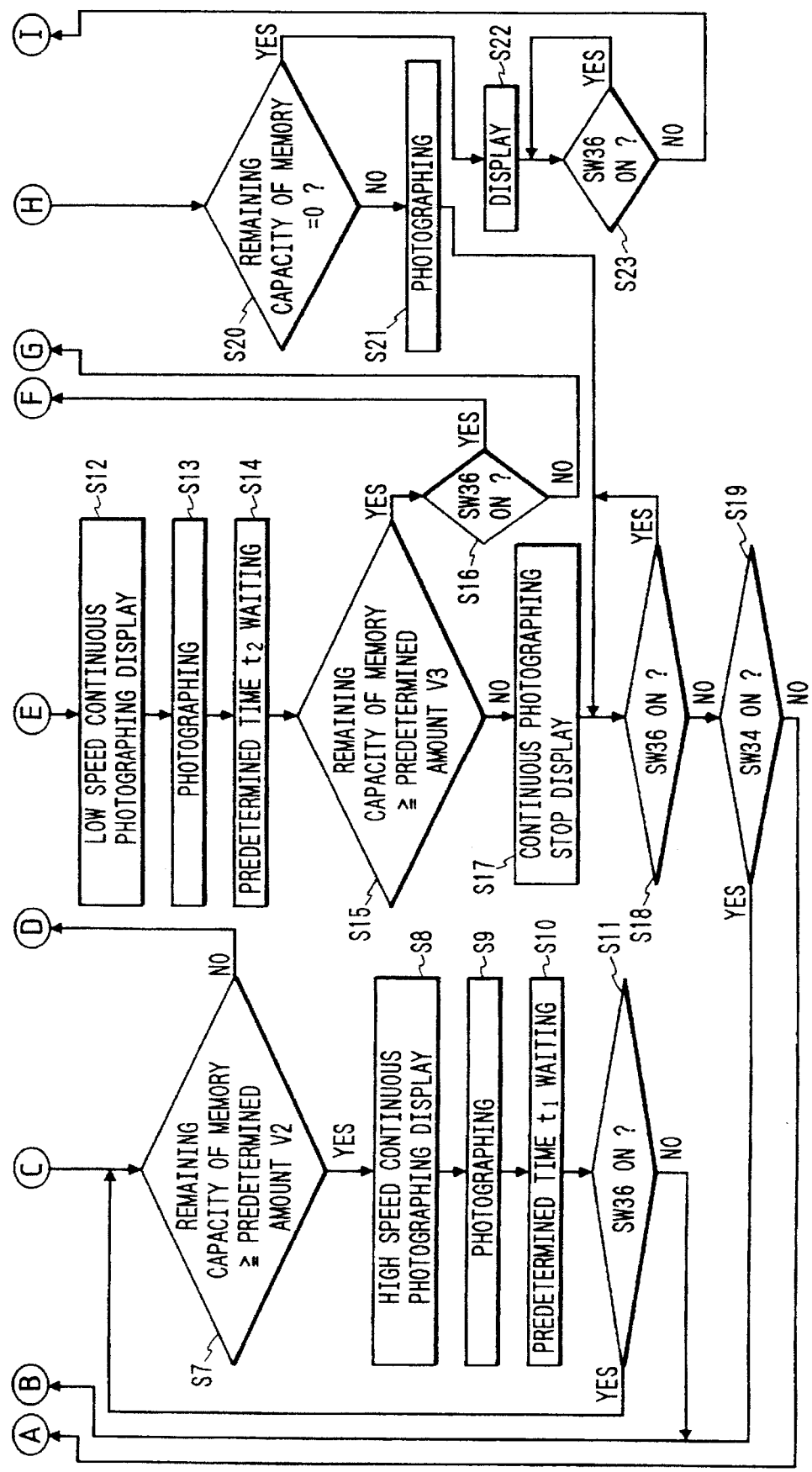

In the following there will be explained an embodiment in which the high-speed continuous recording mode is automatically switched to the low-speed continuous recording mode when the remaining capacity of the memory reaches a predetermined amount, with reference to FIGS. 5A and 5B.

In FIG. 5A, steps S1 to S6 will not be explained as they are identical with those in FIG. 4A. If the remaining capacity of the memory is larger than a predetermined amount V2, there is executed the high-speed continuous recording operation as in the embodiment shown in FIGS. 4A and 4B (S7). If the remaining capacity is smaller than the predetermined amount, the low-speed continuous recording mode is adopted. More specifically, there is given a display indicating the low-speed mode (S12), and the photographing operation is executed (S13). Then after a predetermined waiting time t2 (S14), and, if the remaining capacity of the memory becomes smaller than a predetermined amount V3 (S15), there is given a display indicating that the continuous recording operation is interrupted (S17).

In this embodiment there stands a relation V1>V2>V3. Thus, in the course of execution of the high-speed continuous recording mode, when the remaining capacity of the memory reaches the predetermined amount V2, the continuous recording operation is continued with automatic mode switching to the low-speed continuous recording mode, and the continuous recording operation is interrupted when the remaining capacity reaches the predetermined amount V3.

Figure 6:
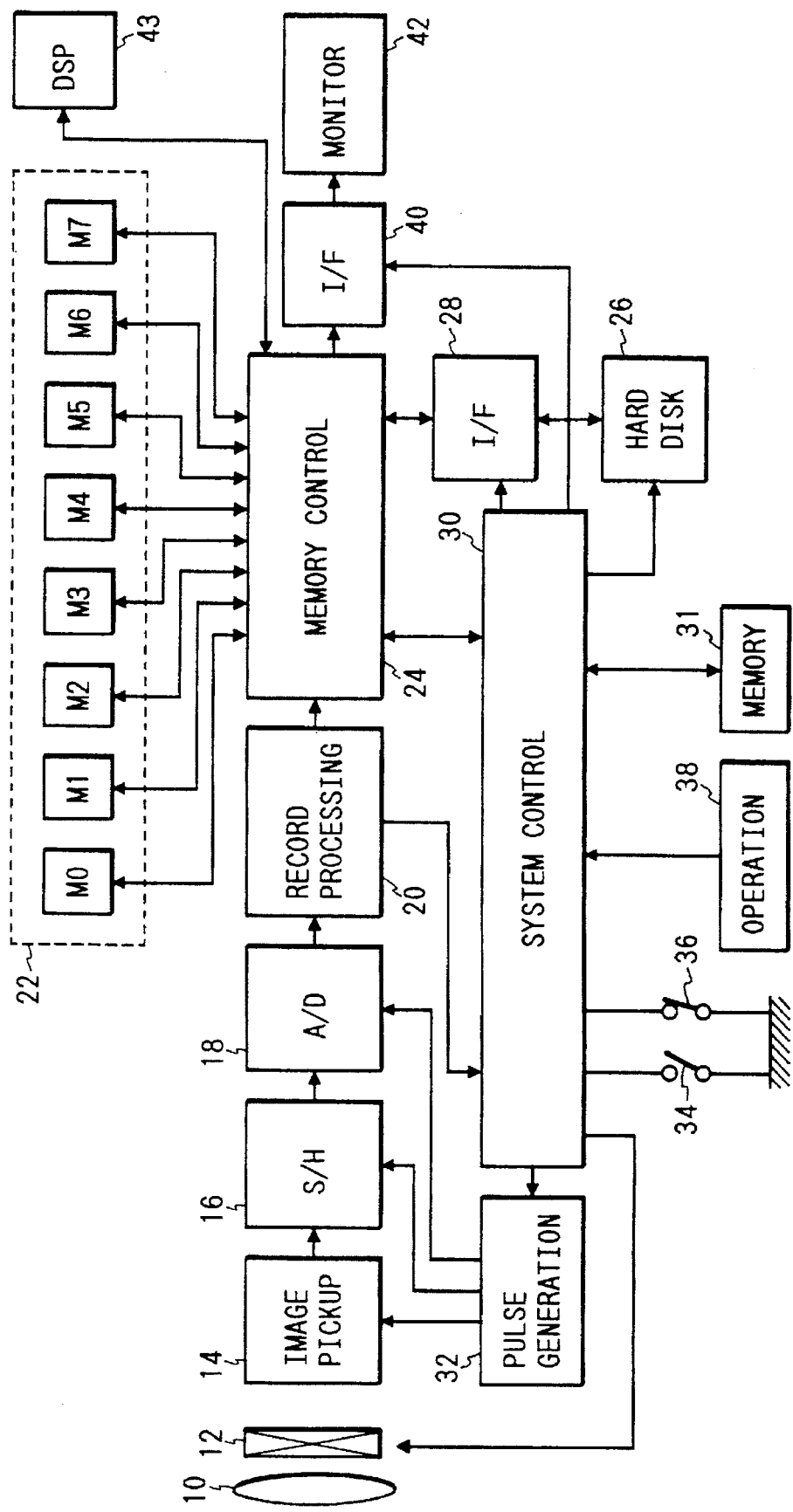
FIG. 6 is a block diagram of a second embodiment of the present invention.

In FIG. 6, there are provided an interface 40 for connecting the memory control circuit 24 with an image-displaying monitor 42 for displaying the image data stored in the memory 22 on the monitor 42; and a digital signal processor (DSP) 43 for effecting a process, such as compression, to be explained later.

FIG. 6 is a block diagram of a second embodiment of the present invention, which is effective in case the time required for image compression of a image plane is longer than the interval of continuous recordings.

In the present embodiment, the recording process circuit 20 only executes the processes achievable on real-time basis such as white balance adjustment and gamma correction, and the processed data are written in succession, by the memory control circuit 24, into eight banks M0–M7 of the buffer memory 22.

Figure 7B:
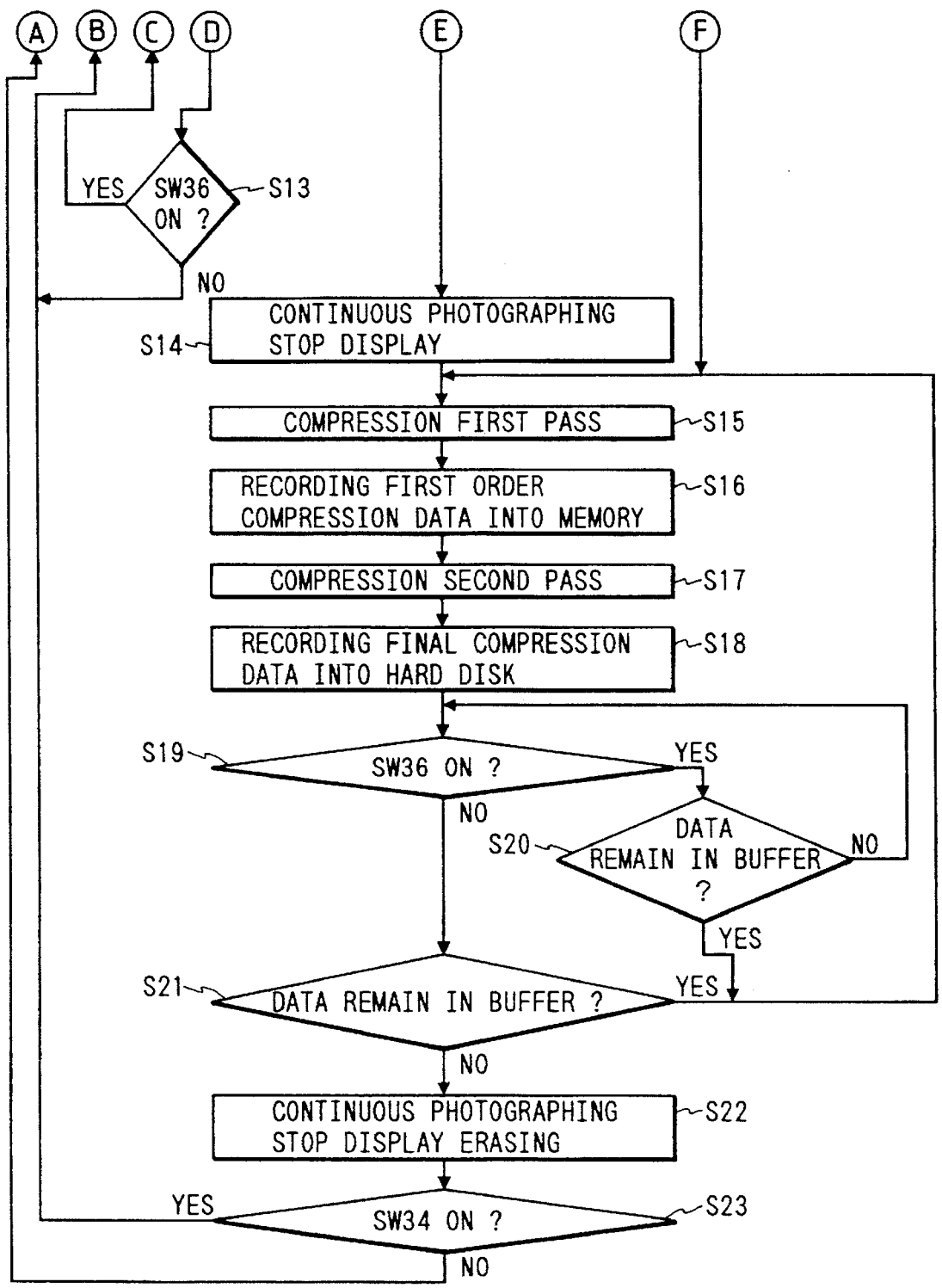
Figure 8B:
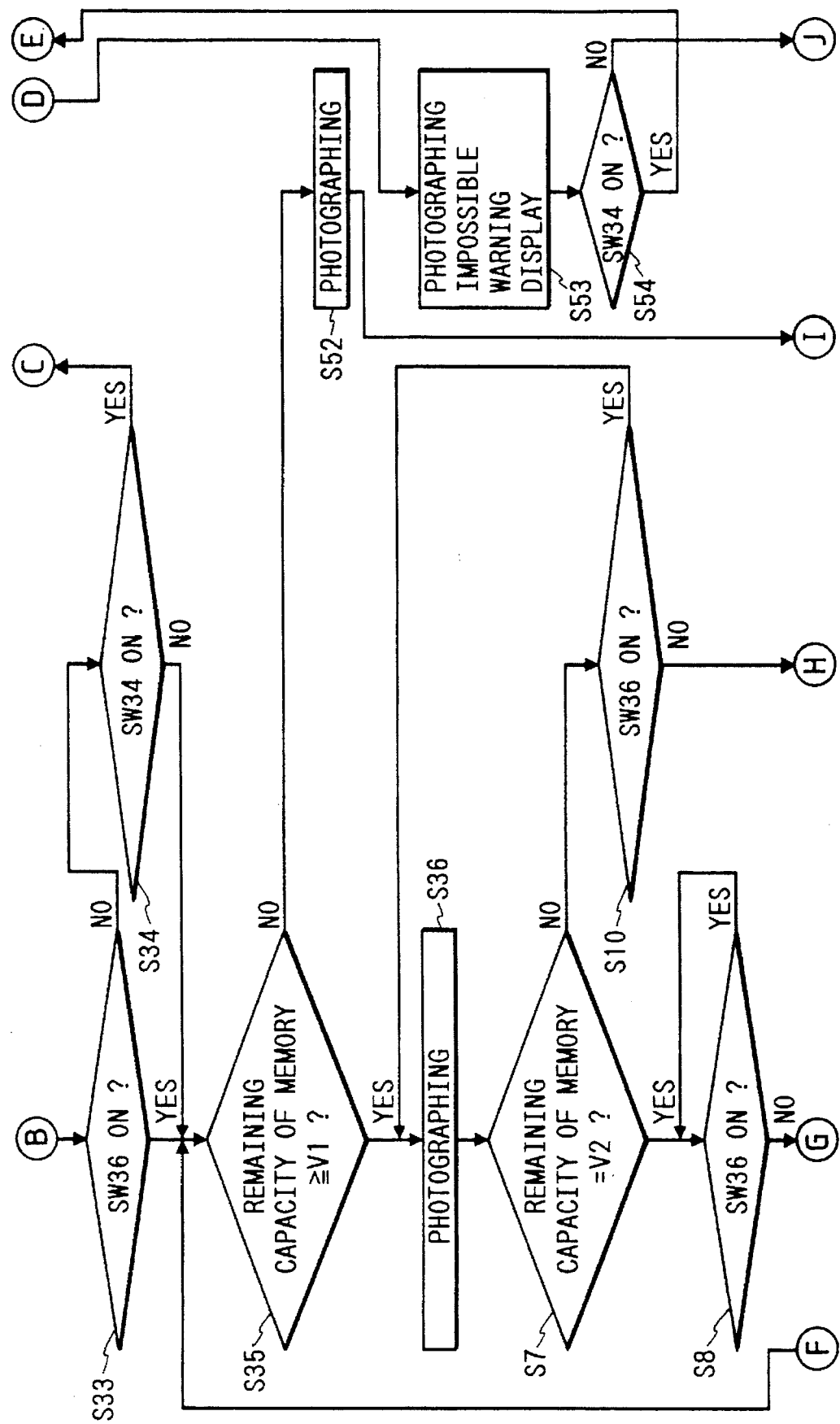
Figure 8C:
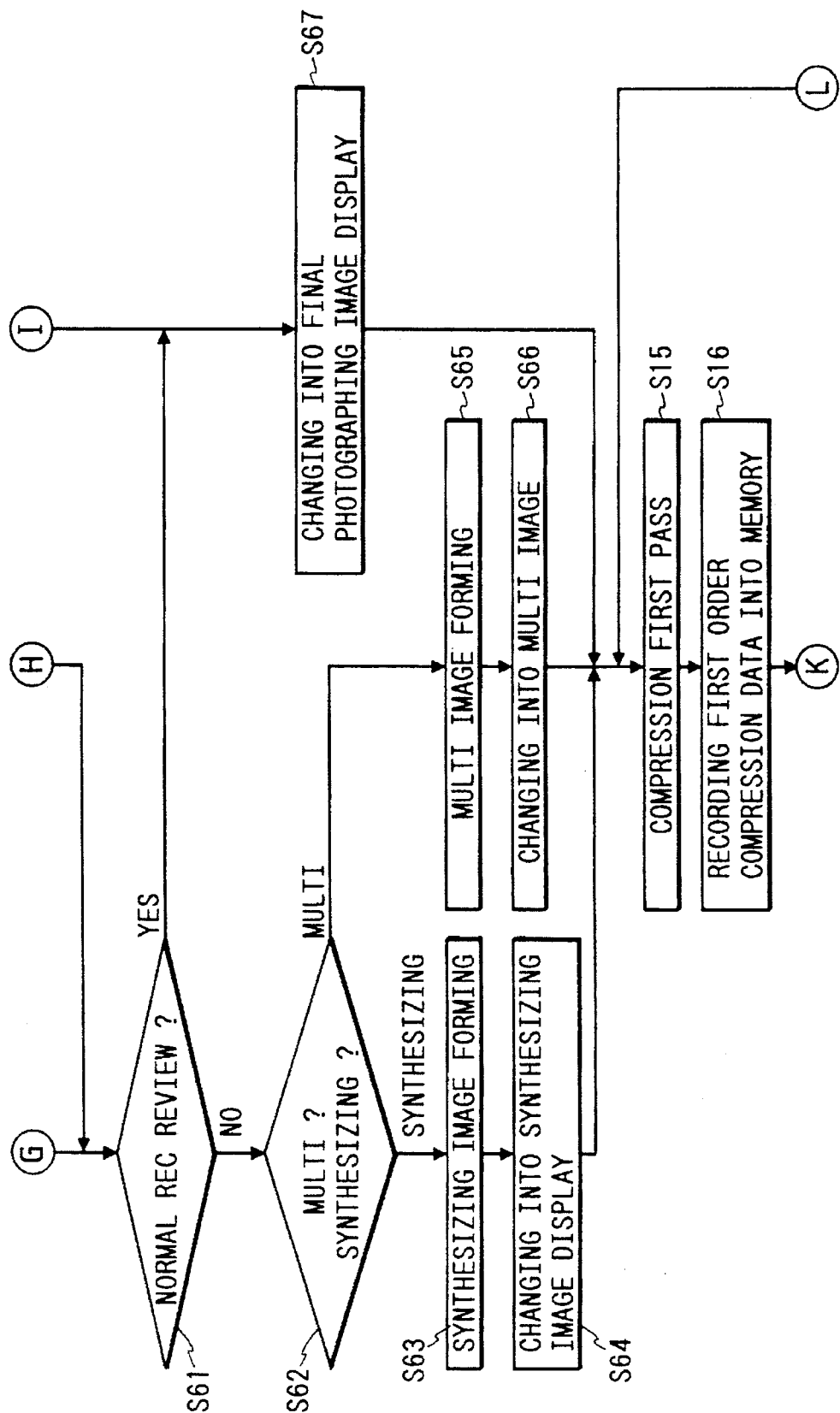

In the single shot mode, after the photographing operation, the image data are subjected to the real-time processes such as the white balance adjustment and gamma correction mentioned above, then stored in the buffer memory 22, then immediately read out again by the memory control circuit 24 and are subjected to time-consuming processes such as compression in the DSP 43. (For example, in the compression by JPEG method, it is possible to reduce the processing time for varying the compression rate according to the data amount after the entropy encoding, by temporarily maintaining the coefficients after DCT, in an empty space in the buffer memory 22, until the entropy encoding is executed. FIGS. 7A and 7B are flow chart showing the function sequence of the above-explained image recording apparatus.

In the following the function of the apparatus will be explained in details with reference to FIGS. 7A and 7B.

When the photographing stand-by switch 34 is turned on (S1), there are executed the photographing stand-by operations (S2). Then there is checked whether the remaining capacity of the memory is zero (S3), and, if zero, there is given a display indicating that the photographing operation is disabled (S4). Then the sequence proceeds to the step S3 or S1 respectively if the photographing stand-by switch 34 is on or off. If the remaining capacity is not zero, the display is erased (S6). Then, when the photographing switch 36 is turned on (S7), the remaining capacity of the memory is checked (S9), and the sequence proceeds to a step S11 if the remaining capacity is equal to or larger than V1, or to a step S10 if the remaining capacity is less than V1. In case the sequence proceeds to the step S11, if the photographing switch 36 is still on, the photographing operation is continued and the obtained data are stored in the buffer memory 22, whereby the continuous recording is executed.

In case the sequence branches from S9 to S10, there is executed the single shot operation along a sequence starting from a step S15. In case the photographing operation is executed in the step S11, and if the remaining capacity of the memory becomes smaller than V2 (S12), there is given a display for interrupting the continuous recording operation (S14). Then the obtained image data are processed by the DSP 43 into the orthogonally transformed data, for example all coefficient data in DCT process (S15), and the data are stored in an empty area of the buffer memory 22, namely in the remaining capaicty after the interruption of the continuous recording operation (S16). Subsequently the data after orthogonal transformation are digitized with predetermined coefficients, and Haffman encoded (S17), and the obtained data are recorded in the rigid disk device 26 (S18). The above-explained steps S15 to S18 are executed until the photographing switch 36 is turned off and the data in the buffer memory 22 are processed and recorded in the rigid disk device (S19–S21).

When the data in the buffer memory 22 have been processed, the sequence proceeds from the step S21 to S22 to erase the display for the interruption of the continuous recording operation, turned on in the step S14. Then there is discriminated whether the photographing stand-by switch 34 is on, and the sequence returns to the step S3 or S1 respectively if said switch on or off.

In the following there will be explained a modified function sequence of the present embodiment, with reference to a flow chart shown in FIGS. 8A through 8D.

This modified sequence has an additional function of immediately reproducing and monitoring the recorded image, in comparison with the seqeunce shown in FIGS. 7A and 7B, and facilitates the monitoring of the continuously recorded images by maintaining a series of continuously recorded images in the form of a multiple image or a synthesized image, in the remaining capacity of the buffer memory.

Referring to FIGS. 8A through 8D, when the photographing stand-by switch 34 is on (S1), there are executed the photographing stand-by operations, and the last taken image is displayed on the monitor directly from the memory control circuit 24, without utilizing the buffer memory 22 (S61). Then there is checked whether the remaining capacity of the buffer memory 22 is zero (S31), and, if zero, there is given a display indicating that the photographing operation is disabled (S53).

If the remaining capacity of the buffer memory 22 is not zero, the display is erased (S32), and, when the photographing switch 36 is turned on (S33), there is discriminated whether the remaining capacity of the memory is equal to or larger than a predetermined amount V1 (S35). If smaller than V1, there is executed a single shot operation (S52), and the obtained data are displayed on the monitor (S67). If equal to or larger than V1, there is executed the photographing operation (S36). Subsequently there is checked whether the remaining capacity of the memory has reached a predetermined amount V2 (S7), and, if the amount V2 has not been reached and the photographing switch 36 is still on (S10), the photographing operation is continued. When the amount V2 is reached, the continuous recording operation is interrupted (S8), and, if the monitor is in the normal display mode (S61), the last taken image is reproduced from the buffer memory 22 and displayed on the monitor (S67). If not in the normal display mode, there is discriminated whether the multi image mode or the synthesized image mode is selected (S62), and, in case of the synthesized image mode, a synthesized image is prepared, utilizing the remaining capacity V2 of the buffer memory 22 (S63) and is displayed on the monitor (S64). In case of the multi image mode, a multi image is prepared utilizing the remaining capacity V2 of the buffer memory 22 (S65) and is displayed on the monitor (S66). The display is continued while the photographing stand-by switch 34 is turned on but the display is totally erased when the switch 34 is turned off, and the sequence proceeds to the step S1 (S24).

In the synthesized image mode of the present embodiment, one of the image stored in the buffer memory 22 and the image not coming through the buffer memory 22 are synthesized and are stored in the remaining capacity V2 of the buffer memory 22.

In the multi image mode, plural images stored in the memory 22 are formed into a multiple image, which is recorded in the remaining capacity of the buffer memory 22.

The sequence after the step S64, S66 or S67 is identical with the steps S15 to S23 in FIG. 7B.

The above-explained embodiment enables various image editings with a simple configuration, effectively utilizing the capacity of the buffer memory, and still the photographer does not lose the opportunity of image recording.

Also the available image editings are not limited to those explained above, but may include other processes such as enlargement or reduction or oblique transformation of the image.

The present invention is not limited to the foregoing embodiments but are subject to various modifications within the scope and spirit of the appended claims.

What is claimed is:

1. An image recording apparatus comprising:

temporary memory means for sequentially inputting image information for a plurality of image planes corresponding to the plurality of image planes one image plane by one image plane and temporarily storing the input image information;

recording means for recording the image information temporarily stored in said temporary memory means, into a recording medium in one of a continuous recording mode in which image information corresponding to the plurality of image planes are sequentially recorded, and a single recording mode in which image information corresponding to a single image plane is recorded;

recording mode instruction means for providing an instruction as to whether a recording operation of the image information by said recording means is executed in the continuous recording mode or in the single recording mode;

detecting means for detecting that an unused capacity of said temporary memory means reaches a predetermined value; and control means for controlling a recording operation of said recording means so as to execute a continuous recording performance in the continuous recording mode until said detecting means detects that the unused memory capacity of said temporary means reaches said predetermined value and controlling the recording operation of said recording means so as to stop said continuous recording performance after said detecting means detects that the unused memory capacity of said temporary memory means reaches said predetermined value, when an instruction is provided by said recording mode instruction means that said recording means records the image information in the continuous recording mode.

2. An image information recording apparatus according to claim 1, further comprising:

image pickup means for picking up an image of an object and generating image information corresponding to the image of the picked-up object.

3. An image information recording apparatus according to claim 1, wherein a recording speed of said recording means is slower than a storing speed of said temporary memory means.

4. An image information recording apparatus according to claim 1, wherein said temporary memory means is composed of a semiconductor memory.

5. An image information recording apparatus according to claim 1, wherein the recording medium comprises a rigid disk.

6. An image information recording apparatus according to claim 1, further comprising:

image information process means for processing the image information temporarily stored in said temporary memory means, wherein a processing speed of said image information process means is slower than a storing speed of said temporary memory means.

7. An image information recording apparatus according to claim 6, wherein said recording means records the image information processed by said image information process means into the recording medium.

8. An image information recording apparatus comprising:

temporary memory means for sequentially inputting image information for a plurality of image planes corresponding to the plurality of image planes one image plane by one image plane and temporarily storing the input image information;

recording means for recording the image information temporarily stored in said temporary memory means, into a recording medium in one of a continuous recording mode in which image information corresponding to the plurality of image planes are sequentially recorded, and a single recording mode in which image information corresponding to a single image plane is recorded;

recording mode instruction means for providing an instruction as to whether a recording operation of the image information by said recording means is executed in the continuous recording mode or in the single recording mode;

detecting means for detecting an unstored capacity of said temporary memory means;

display means for executing a display corresponding to the unstored capacity of said temporary image means detected by said detecting means; and control means for controlling a recording operation of said recording means so as to execute a continuous recording performance in the continuous recording mode until said detecting means detects that the unstored memory capacity of said temporary memory means reaches a predetermined value and controlling the recording operation of said recording means so as to stop said continuous recording performance after said detecting means detects that the unstored memory capacity of said temporary memory means reaches the predetermined value, when an instruction is provided by said recording mode instruction means that said recording means records the image information in the continuous recording mode.

9. An image information recording apparatus according to claim 8, further comprising:

image pickup means for picking up an image of an object and generating image information corresponding to the picked-up image of the object.

10. An image information recording apparatus according to claim 8, wherein a recording speed of said recording means is slower than a storing speed of said temporary memory means.

11. An image information recording apparatus according to claim 8, wherein said temporary memory means comprises a semiconductor memory.

12. An image information recording apparatus according to claim 8, wherein the recording medium comprises a rigid disk.

13. An image information recording apparatus according to claim 8, further comprising:

image information process means for processing the image information temporarily stored in said temporary memory means, wherein a processing speed of said image information process means is slower than a storing speed of said temporary memory means.

14. An image information recording apparatus according to claim 8, wherein said recording means records the image information processed by said image information process means into the recording medium.

15. An image information recording apparatus, comprising:

temporary memory means for sequentially inputting image information corresponding to a plurality of image planes one image plane by one image plane and temporarily storing the input image information;

recording means for recording the image information temporarily stored in said temporary memory means, into a recording medium in one of a continuous recording mode in which the image information corresponding to the plurality of image planes are sequentially recorded, and a single recording mode in which image information corresponding to a single image plane is recorded;

recording mode instruction means for providing an instruction as to whether a recording operation of the image information by the recording means is executed in the continuous recording mode or in the single recording mode;

detecting means for detecting when an unused capacity of said temporary memory means reaches a predetermined value; and control means for controlling a recording operation of said recording means so as to execute a continuous recording performance in a continuous recording mode until said detecting means detects that the unstored memory capacity of said temporary memory means reaches the predetermined value and controlling the recording operation of said recording means so as to reduce a recorded speed of the continuous recording performance after said detecting means detects that the unstored memory capacity of said temporary memory means reaches the predetermined value, when an instruction is provided by the recording mode instruction means that said recording means records the image information in the continuous recording mode.

16. Apparatus according to claim 15, further comprising image pickup means for picking up an image of an object and generating image information corresponding to the picked up image.

17. Apparatus according to claim 15, wherein a recording speed of said recording means is slower than a storing speed of said temporary memory means.

18. Apparatus according to claim 15, further comprising image information processing means for processing the image information temporarily stored in said temporary memory means, and wherein a processing speed of said image information processing means is slower than a storing speed of said temporary memory means.

19. Apparatus according to claim 18, wherein said recording means records the image information processed by said image information processing means onto a recording medium.

20. An image information recording apparatus, comprising:

- temporary memory means for sequentially inputting image information corresponding to a plurality of image planes one image plane by one image plane and temporarily storing the input image information;
- recording means for recording the image information temporarily stored in said temporary memory means, onto a recording medium in one of a continuous recording mode in which the image information corresponding to the plurality of image planes are sequentially recorded, and a single recording mode in which image information corresponding to the single image plane is recorded;
- recording mode instruction means for providing an instruction as to whether a recording operation of the image information by said recording means is executed in the continuous recording mode or the single recording mode;
- detecting means for detecting an unstored capacity of said temporary memory means;
- display means for providing a display corresponding to the unstored capacity of said temporary memory means detected by said detecting means; and
- control means for controlling a recording operation of said recording means so as to execute a continuous recording performance in the continuous recording mode until said detecting means detects that the unstored memory capacity of said temporary memory means reaches the predetermined value and controlling the recording operation of said recording means so as to reduce a recording speed of said continuous recording performance after said detecting means detects that the unstored memory capacity of said temporary memory means reaches the predetermined value, when the instruction is provided by said recording mode instruction means that said recording means records the image information and the continuous recording mode.

21. Apparatus according to claim 20, further comprising image pickup means for picking up an image of an object and generating image information corresponding to the picked-up image.

22. Apparatus according to claim 20, wherein a recording speed of said recording means is slower than a storing speed of said temporary memory means.

23. Apparatus according to claim 20, further comprising image information processing means for processing the image information temporary stored in said temporary memory means, and wherein a processing speed of said image information processing means is slower than a storing speed of said temporary memory means.

24. Apparatus according to claim 23, wherein said recording means records the image information processed by said image information processing means onto the recording medium.

* * * * *

UNITED STATES PATENT AND TRADEMARK OFFICE
CERTIFICATE OF CORRECTION

PATENT NO. : 5,633,976         Page 1 of 3
DATED      : May 27, 1997
INVENTOR(S): HIROYUKI OGINO It is certified that error appears in the above-identified patent and that said Letters Patent is hereby corrected as shown below:

Title page, item
[56] References Cited
    FOREIGN PATENT DOCUMENTS

"01288491" should read --1-288491--.

Column 3

Line 57, "( exposing" should read --(exposing--.

Column 4

Line 59, "a" should read --an--.
    Line 60, "operation (S5)," should read --operation (S6),--
    Line 64, "a" should read --an--.

Column 7

Line 35, "(S11), when" should read --(S11). When--.
    Line 41, "capaicty" should read --capacity--.

UNITED STATES PATENT AND TRADEMARK OFFICE
CERTIFICATE OF CORRECTION

PATENT NO. : 5,633,976

DATED : May 27, 1997

INVENTOR(S) : HIROYUKI OGINO

It is certified that error appears in the above-identified patent and that said Letters Patent is hereby corrected as shown below:

Column 8

Line 27, "a" should read --an--.
Line 51, "details" should read --detail--.

Column 9

Line 13, "capaicty" should read --capacity--.
Line 16, "Haffman" should read --Huffman--.
Line 28, "switch" should read --switch is--.

Column 10

Line 32, "are" should read --is--.
Line 61, "means" should read --memory means--.

Column 11

Line 14, "is com-" should read --comprises--.
Line 15, "posed of" should be deleted.

UNITED STATES PATENT AND TRADEMARK OFFICE
CERTIFICATE OF CORRECTION

PATENT NO. : 5,633,976
DATED : May 27, 1997
INVENTOR(S) : HIROYUKI OGINO

It is certified that error appears in the above-identified patent and that said Letters Patent is hereby corrected as shown below:

<u>Column 12</u>

Line 57, "recorded" should read --recording--.
　　　Line 67, "picked up" should read --picked-up--.

<u>Column 14</u>

Line 25, "temporary" (first occurrence) should read --temporarily--.

Signed and Sealed this

Sixth Day of January, 1998

Attest:

BRUCE LEHMAN

*Attesting Officer*　　*Commissioner of Patents and Trademarks*